(12) United States Patent
Bailey et al.

(10) Patent No.: US 12,505,433 B2
(45) Date of Patent: *Dec. 23, 2025

(54) TOKENIZING SENSITIVE DATA

(71) Applicant: Worldpay, LLC, Symmes Township, OH (US)

(72) Inventors: Bryan T. Bailey, Florence, KY (US); John Romer, Wilmington, OH (US); Chris Doyle, Alexandria, KY (US); Jeremy Gifford, Mason, OH (US); Kevin Zibart, Pewee Valley, KY (US)

(73) Assignee: Worldpay, LLC, Symmes Township, OH (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/513,923

(22) Filed: Nov. 20, 2023

(65) Prior Publication Data

US 2024/0086908 A1 Mar. 14, 2024

Related U.S. Application Data

(63) Continuation of application No. 17/491,097, filed on Sep. 30, 2021, now Pat. No. 11,861,603, which is a continuation of application No. 16/657,578, filed on Oct. 18, 2019, now Pat. No. 11,164,183, which is a continuation of application No. 16/057,450, filed on Aug. 7, 2018, now Pat. No. 10,489,784, which is a continuation of application No. 15/696,626, filed on Sep. 6, 2017, now Pat. No. 10,068,229, which is a continuation of application No. 14/563,076, filed on Dec. 8, 2014, now Pat. No. 9,785,938, which is a
(Continued)

(51) Int. Cl.
*G06Q 20/38* (2012.01)
*G06F 21/60* (2013.01)
*G06Q 20/12* (2012.01)
*H04L 9/08* (2006.01)
*H04L 9/32* (2006.01)

(52) U.S. Cl.
CPC ........ *G06Q 20/3829* (2013.01); *G06F 21/60* (2013.01); *G06Q 20/12* (2013.01); *G06Q 20/38215* (2013.01); *G06Q 20/3823* (2013.01); *H04L 9/0891* (2013.01); *H04L 9/3234* (2013.01); *H04L 2209/56* (2013.01)

(58) Field of Classification Search
CPC .............. G06Q 20/3829; G06Q 20/12; G06Q 20/38215; G06Q 20/3823; G06F 21/60; H04L 9/0891; H04L 9/3234; H04L 2209/56; H04L 63/08
USPC ...................................... 705/76, 67
See application file for complete search history.

(56) References Cited

U.S. PATENT DOCUMENTS 5,625,694 A 4/1997 Lee et al.
5,982,896 A 11/1999 Cordery et al.
(Continued)

*Primary Examiner* — Abu S Sholeman
(74) *Attorney, Agent, or Firm* — Bookoff McAndrews, PLLC

(57) ABSTRACT

Included are embodiments for tokenizing sensitive data. Some embodiments of systems and/or methods are configured to receive sensitive data from a vendor, determine a token key for the vendor, and utilize a proprietary algorithm, based on the token key to generate a vendor-specific token that is associated with the sensitive data. Some embodiments include creating a token identifier that comprises data related to the token key sending the vendor-specific token and the token identifier to the vendor.

19 Claims, 10 Drawing Sheets

Related U.S. Application Data continuation of application No. 13/117,599, filed on May 27, 2011, now Pat. No. 8,943,574.

(56) References Cited

U.S. PATENT DOCUMENTS

| | | | |
|---|---|---|---|
| 6,163,811 A | 12/2000 | Porter | |
| 6,418,420 B1* | 7/2002 | DiGiorgio | G06Q 20/10 |
| | | | 705/40 |
| 6,560,706 B1 | 5/2003 | Carbajal et al. | |
| 7,454,356 B2* | 11/2008 | Fields | G06Q 10/0834 |
| | | | 705/26.42 |
| 7,555,460 B1 | 6/2009 | Barkan | |
| 7,827,101 B2 | 11/2010 | Mascavage, III | |
| 8,458,487 B1 | 6/2013 | Palgon et al. | |
| 8,601,553 B1 | 12/2013 | Griffin et al. | |
| 8,819,769 B1 | 8/2014 | Dijk et al. | |
| 8,935,802 B1 | 1/2015 | Mattsson et al. | |
| 8,978,152 B1 | 3/2015 | Rozenberg et al. | |
| 9,313,024 B1 | 4/2016 | Stute | |
| 9,354,629 B2 | 5/2016 | Balentine et al. | |
| 9,425,958 B2 | 8/2016 | Vennelakanti et al. | |
| 9,704,190 B2 | 7/2017 | Custer | |
| 9,824,471 B2 | 11/2017 | Lei et al. | |
| 2002/0002538 A1 | 1/2002 | Ling | |
| 2002/0035540 A1 | 3/2002 | Yamaguchi | |
| 2002/0152126 A1 | 10/2002 | Lieu et al. | |
| 2002/0184508 A1* | 12/2002 | Bialick | G06F 21/10 |
| | | | 713/182 |
| 2002/0198848 A1 | 12/2002 | Michener | |
| 2003/0115140 A1 | 6/2003 | Pal | |
| 2004/0081120 A1 | 4/2004 | Chaskar | |
| 2004/0123159 A1 | 6/2004 | Kerstens et al. | |
| 2004/0128257 A1 | 7/2004 | Okamoto et al. | |
| 2004/0153451 A1 | 8/2004 | Phillips et al. | |
| 2005/0071809 A1 | 3/2005 | Pulley | |
| 2005/0108627 A1 | 5/2005 | Mireku | |
| 2005/0138386 A1 | 6/2005 | Saint | |
| 2005/0154913 A1 | 7/2005 | Barriga et al. | |
| 2005/0277420 A1 | 12/2005 | Shin et al. | |
| 2006/0015358 A1 | 1/2006 | Chua | |
| 2006/0031085 A1 | 2/2006 | Postel et al. | |
| 2006/0277112 A1 | 12/2006 | Lieu et al. | |
| 2006/0287004 A1 | 12/2006 | Fuqua | |
| 2007/0118393 A1 | 5/2007 | Rosen et al. | |
| 2007/0130194 A1 | 6/2007 | Kaiser | |
| 2008/0028470 A1 | 1/2008 | Remington et al. | |
| 2008/0115201 A1 | 5/2008 | Sturms et al. | |
| 2008/0215489 A1 | 9/2008 | Lawson et al. | |
| 2008/0243702 A1* | 10/2008 | Hart | H04L 9/3234 |
| | | | 705/69 |
| 2008/0244721 A1 | 10/2008 | Barrus et al. | |
| 2008/0307229 A1 | 12/2008 | Andersson et al. | |
| 2008/0313088 A1 | 12/2008 | Cahn | |
| 2009/0076967 A1* | 3/2009 | Fields | G06Q 20/3674 |
| | | | 705/76 |
| 2009/0106150 A1 | 4/2009 | Pelegero et al. | |
| 2009/0193511 A1 | 7/2009 | Noe et al. | |
| 2009/0271847 A1 | 10/2009 | Karjala et al. | |
| 2010/0145860 A1 | 6/2010 | Pelegero | |
| 2010/0190472 A1 | 7/2010 | Gorthi et al. | |
| 2010/0257612 A1 | 10/2010 | McGuire et al. | |
| 2010/0325297 A1* | 12/2010 | Romney | G06Q 30/02 |
| | | | 235/375 |
| 2011/0075652 A1 | 3/2011 | Ogura | |
| 2011/0082780 A1 | 4/2011 | Nagaram et al. | |
| 2011/0103586 A1 | 5/2011 | Nobre | |
| 2011/0126002 A1 | 5/2011 | Fu et al. | |
| 2011/0138453 A1 | 6/2011 | Verma et al. | |
| 2011/0154466 A1 | 6/2011 | Harper et al. | |
| 2011/0166992 A1 | 7/2011 | Dessert et al. | |
| 2011/0173684 A1 | 7/2011 | Hurry et al. | |
| 2011/0178863 A1 | 7/2011 | Daigle | |
| 2011/0191829 A1* | 8/2011 | Fischer | H04L 9/3234 |
| | | | 726/4 |
| 2011/0307710 A1 | 12/2011 | McGuire et al. | |
| 2011/0320344 A1 | 12/2011 | Faith et al. | |
| 2012/0060210 A1 | 3/2012 | Baker et al. | |
| 2012/0072762 A1 | 3/2012 | Atchison et al. | |
| 2012/0095822 A1 | 4/2012 | Chiocchi | |
| 2012/0113985 A1 | 5/2012 | Lee et al. | |
| 2012/0117561 A1 | 5/2012 | Lee et al. | |
| 2012/0167098 A1 | 6/2012 | Lee et al. | |
| 2012/0216269 A1 | 8/2012 | Yeung et al. | |
| 2012/0284506 A1 | 11/2012 | Kravitz et al. | |
| 2012/0323654 A1 | 12/2012 | Writer | |
| 2013/0036048 A1 | 2/2013 | Campos et al. | |
| 2013/0086141 A1 | 4/2013 | Saldhana | |
| 2013/0124755 A1 | 5/2013 | Haywood et al. | |
| 2013/0160099 A1 | 6/2013 | Fitzpatrick, III | |
| 2013/0212007 A1 | 8/2013 | Mattsson et al. | |
| 2014/0143089 A1 | 5/2014 | Campos et al. | |
| 2014/0195425 A1 | 7/2014 | Campos et al. | |
| 2014/0310811 A1 | 10/2014 | Hentunen | |
| 2015/0172287 A1 | 6/2015 | Ortiz et al. | |
| 2015/0207787 A1* | 7/2015 | Cannell | H04L 63/08 |
| | | | 726/4 |
| 2016/0180334 A1 | 6/2016 | Kassemi et al. | |
| 2016/0323110 A1 | 11/2016 | Campagna et al. | |
| 2023/0196356 A1 | 6/2023 | Ortiz et al. | |

\* cited by examiner

TOKENIZING SENSITIVE DATA

CROSS REFERENCE

This application is a continuation of and claims the benefit of priority to U.S. application Ser. No. 17/491,097, filed on Sep. 30, 2021, which is a continuation of and claims the benefit of priority to U.S. application Ser. No. 16/657,578, filed on Oct. 18, 2019, now U.S. Pat. No. 11,164,183, which is a continuation of and claims the benefit of priority to U.S. application Ser. No. 16/057,450, filed on Aug. 7, 2018, now U.S. U.S. Pat. No. 10,489,784, which is a continuation of and claims the benefit of priority to U.S. application Ser. No. 15/696,626, filed on Sep. 6, 2017, now U.S. Pat. No. 10,068,229, which is a continuation of and claims the benefit of priority to U.S. application Ser. No. 14/563,076, filed on Dec. 8, 2014, now U.S. Pat. No. 9,785,938, which is a continuation of and claims the benefit of priority to U.S. application Ser. No. 13/117,599, filed on May 27, 2011, now U.S. Pat. No. 8,943,574, all of which are hereby incorporated by reference in their entireties.

BACKGROUND

In many financial transactions, a user may purchase a product (such as a tangible product, a service product, etc.) by using a credit card, debit card, gift card, prepaid card, and/or other payment mechanism that includes sensitive data. Similarly, many other electronic transactions may utilize sensitive data, such as a social security number, a telephone number, an email address, etc., where the owner of that information trusts a vendor or other party to securely maintain the sensitive data. However, due to the nature of electronic transactions, each vendor that receives the sensitive data from the user must take measures to ensure the security of the sensitive data. As the user may transact with dozens of different vendors and other entities and each of those entities may receive the sensitive data, security holes may develop and the sensitive data may be compromised.

SUMMARY

Included are embodiments for tokenizing sensitive data. Some embodiments of a method may be configured to receive sensitive data from a vendor, determine a token key for the vendor, and utilize a proprietary algorithm, based on the token key to generate a vendor-specific token that is associated with the sensitive data. Some embodiments include creating a token identifier that comprises data related to the token key sending the vendor-specific token and the token identifier to the vendor.

Also included are embodiments of a system. Some embodiments of the system include a memory component that stores logic that when executed by the system, causes the system to receive sensitive data from a vendor, determine a token key for the vendor, the token key identifying a proprietary algorithm for generating a token, and utilize the proprietary algorithm, based on the token key to generate a vendor-specific token that is associated with the sensitive data. Similarly, in some embodiments, the logic further causes the system to create a token identifier that comprises data related to the token key and send the vendor-specific token and the token identifier to the vendor.

Also included are embodiments of a non-transitory computer-readable medium. Some embodiments of the non-transitory computer-readable medium include logic that causes a computing device to receive sensitive data from a vendor, determine a token key for the vendor, and utilize a proprietary algorithm, based on the token key to generate a token that is associated with the sensitive data. Some embodiments may further cause the computing device to create a token identifier that comprises data related to the token key and send the token and the token identifier to the vendor.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
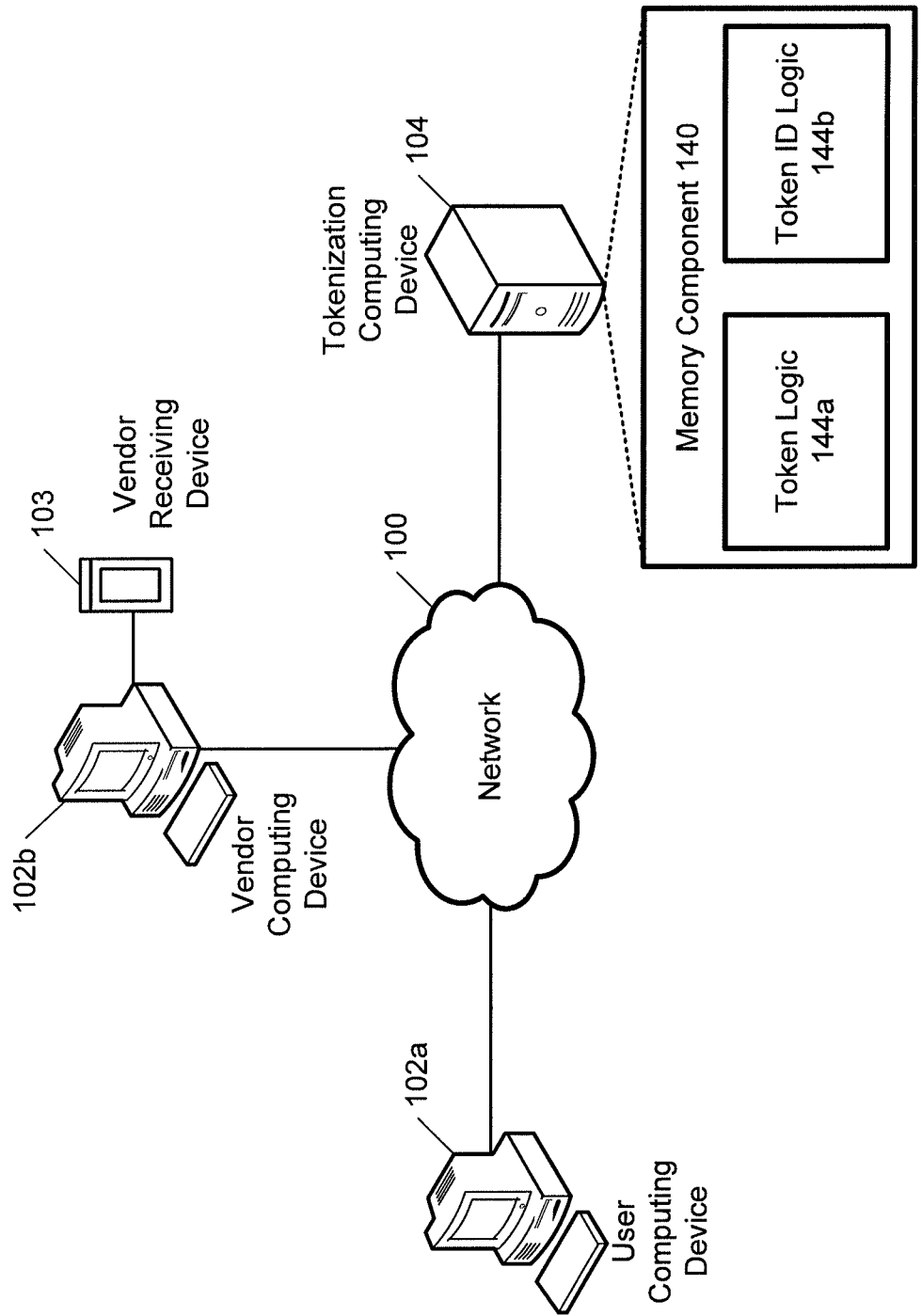
FIG. 1 depicts a computing environment for tokenizing sensitive data, according to embodiments disclosed herein.

Embodiments disclosed herein include a system and/or method for tokenizing sensitive data. As a background, theft of sensitive data (such as credit card numbers, prepaid debit card numbers, social security numbers, etc.) has become a serious problem. As more and more vendors store sensitive data on their local systems, the security of that data may be compromised. Hackers and others with malicious intent may access sensitive data and utilize that data for identity theft, credit card theft, etc. While many vendors may encrypt the sensitive data, such encryptions may be subject to security issues. Additionally, storage of sensitive data at a vendor computing device is not desirable.

Embodiments disclosed herein include a vendor computing device and a tokenization computing device. The vendor computing device may include and/or be coupled to a receiving device, such as a card swiping device. The receiving device may be coupled to the internet or other network and may be configured for communication with the tokenization computing device. The vendor computing device may also be configured to receive and store tokens and token identifiers from the tokenization computing device. In some embodiments, the tokens are a 16 digit value and the token identifier is a 6 byte value. However, this is just an example, as any size token and/or token identifier may be utilized, depending on the embodiment. Regardless, the tokenization computing device may be communicatively coupled to the vendor computing device. The tokenization computing device may include a software application to facilitate receiving of sensitive data; tokenization of the sensitive data to create a token, such as a vendor-specific token; generation of a token identifier; and/or perform other actions. Additionally, in some embodiments, the token and token identifier may be algorithmically compiled into a single value rather than discrete values. This single value may additionally be decompiled into separate values to derive the token and token identifier values that are utilized to process a transaction.

As an example, a vendor may input sensitive data into the receiving device. The receiving device can encrypt the sensitive data (in this case card data) and send this encrypted data to the tokenization computing device. The tokenization computing device may then generate token, based on a random number assignment, an algorithm, and/or via another mechanism. The tokenization computing device may additionally generate a token identifier. The token identifier is then linked to the token and is configured to provide token generation data, token version data, as well as a sanity value to ensure correctness of the token. The sanity value may be similar to a check value, depending on the embodiment. More specifically, the sanity value is calculated as a result of using clear data as input into a predetermined algorithm. This data is used to validate the result from a tokenization. When a mismatch between the sanity value and the tokenization occurs, this indicates that the detokenization process has failed. The token and token identifier may then be sent to the vendor computing device, which stores the token and token identifier, with a link between the two. The vendor computing device may then utilize the token for customer transactions, customer statistics, returns, settlement files, etc. without storing or otherwise having direct access to the actual card number.

Similarly, when the vendor wishes to access the card data for a stored token, the vendor can send the token and corresponding token identifier to the tokenization computing device. The tokenization computing device can access the token and identifier to determine the card data. The tokenization computing device can detokenize the token, based on the token generation identified in the token identifier. Upon detokenization, the tokenization computing device can verify that the correct card number was determined by decryption of the sanity value in the token identifier. The tokenization computing device can then encrypt the card number and send the encrypted card number to the vendor.

In some embodiments, the tokenization computing device may be instructed to rotate tokens on a predetermined schedule. The schedule may be determined by the vendor, government entity, and/or via other mechanism. More specifically, in some embodiments, rotation may occur as a result of an alleged or actual network/data breach, an industry regulation requirement and/or a network regulation requirement. Regardless, the tokenization computing device can receive one or more tokens (with corresponding token identifiers) from a vendor. From the token identifiers, the tokenization computing device can determine a current generation of token. From this data, the tokenization computing device can determine the card number and verify this with the sanity value in the token identifier. Once the card number has been determined, the tokenization computing device can re-tokenize the token. The re-tokenization can be simply to update the generation and/or to utilize a different tokenization mechanism. Regardless, once the token has been updated, the token identifier may be also updated to reflect this change in the token, as well as to create a sanity value for verification. The updated tokens and token identifiers may then be sent to the vendor.

Referring now to the drawings, FIG. 1 depicts a computing environment for tokenizing sensitive data, according to embodiments disclosed herein. As illustrated in FIG. 1, a network 100 may include a wide area network, such as the Internet, a local area network (LAN), a mobile communications network, a public service telephone network (PSTN) and/or other network and may be coupled to a user computing device 102a, a vendor computing device 102b, a vendor receiving device 103, and a tokenization computing device 104.

The user computing device 102a may be any mobile or non-mobile computing device configured for facilitating electronic transactions. As an example, the user computing device 102a may include a personal computer that is configured to make online purchases. A user of the user computing device 102a may submit sensitive data, which may include financial sensitive data (such as a credit card number, debit card number, prepaid card number, bank account number, etc.) and/or non-financial sensitive data (such as a name, an address, a telephone number, a social security number, etc.) to facilitate payment for this transaction. Depending on the particular embodiment, the sensitive data may be numeric or alpha-numeric in form. Regardless, this data may be sent to the vendor computing device 102b, which may communicate with the tokenization computing device 104, as described below.

Similarly, the vendor computing device 102b may also include a mobile or non-mobile personal computer (or other computing device) for facilitating transactions. In the example above, the vendor computing device 102b may be configured as an online vendor for receiving electronic orders from user computing device 102a. In such embodiments, the vendor computing device 102b may receive the sensitive data from the user and submit the sensitive data to the tokenization computing device 104 for processing.

In some embodiments however, the vendor computing device 102b may be located in a physical establishment for in-store purchases. In such embodiments, the vendor computing device 102b may be coupled to the vendor receiving device 103 for receiving the sensitive data directly from a card or other device. As such, the vendor receiving device 103 may be configured as a card swiping machine, which may be coupled to and/or integral with the vendor computing device 102b. Once the sensitive data is received, the vendor computing device 102b can send the sensitive data to the tokenization computing device 104 for processing.

The tokenization computing device 104 may again include any mobile or non-mobile computing device and function as part of a financial institution, such as a bank, lender, mortgage company, etc. The tokenization computing device 104 may receive the sensitive data from the user computing device 102a and/or vendor computing device 102b, as described above and may include a memory component 140 that stores token logic 144a and token identifier (ID) logic 144b. With the token logic 144a and the token ID logic 144b, tokenization and detokenization of sensitive data may be performed.

The token logic 144a may be configured to cause the tokenization computing device 104 to generate a token for a piece of sensitive data. Calculation of the token may include identifying a key that defines the current token. The token logic 144a may also cause the tokenization computing device 104 to provide the sensitive data for canceling orders with the vendor, updating/rotating tokens, etc. The token ID logic 144b may cause the tokenization computing device 104 to create a token identifier field that is coupled to a token. More specifically, the token identifier may be configured to identify a current version of the token; provide a verification that the generated token (or sensitive data) is correct and/or provide the key that was used to generate this type of token. In some embodiments, the token ID logic 144b may also be configured to provide a rollout identifier for associating tokens from different vendors together, as described in more detail, below.

It should be understood that while the user computing device 102a, vendor computing device 102b, the vendor receiving device 103, and the tokenization computing device 104 are depicted in FIG. 1 as personal computers and/or servers, these are merely examples. More specifically, in some embodiments any type of computing device (e.g. mobile computing device, personal computer, server, etc.) may be utilized for any of these components. Additionally, while each of these computing devices 102-104 is illustrated in FIG. 1 as a single piece of hardware, this is also an example. Depending on the particular embodiment, each of the computing devices 102-104 may represent a plurality of computers, servers, databases, etc.

It should also be understood that while the token logic 144a and token ID logic 144b are depicted in the tokenization computing device 104, this is also just an example. In some embodiments, the user computing device 102a, the tokenization computing device 104, and/or the vendor computing device 102b may include this and/or similar logical components.

Figure 2:
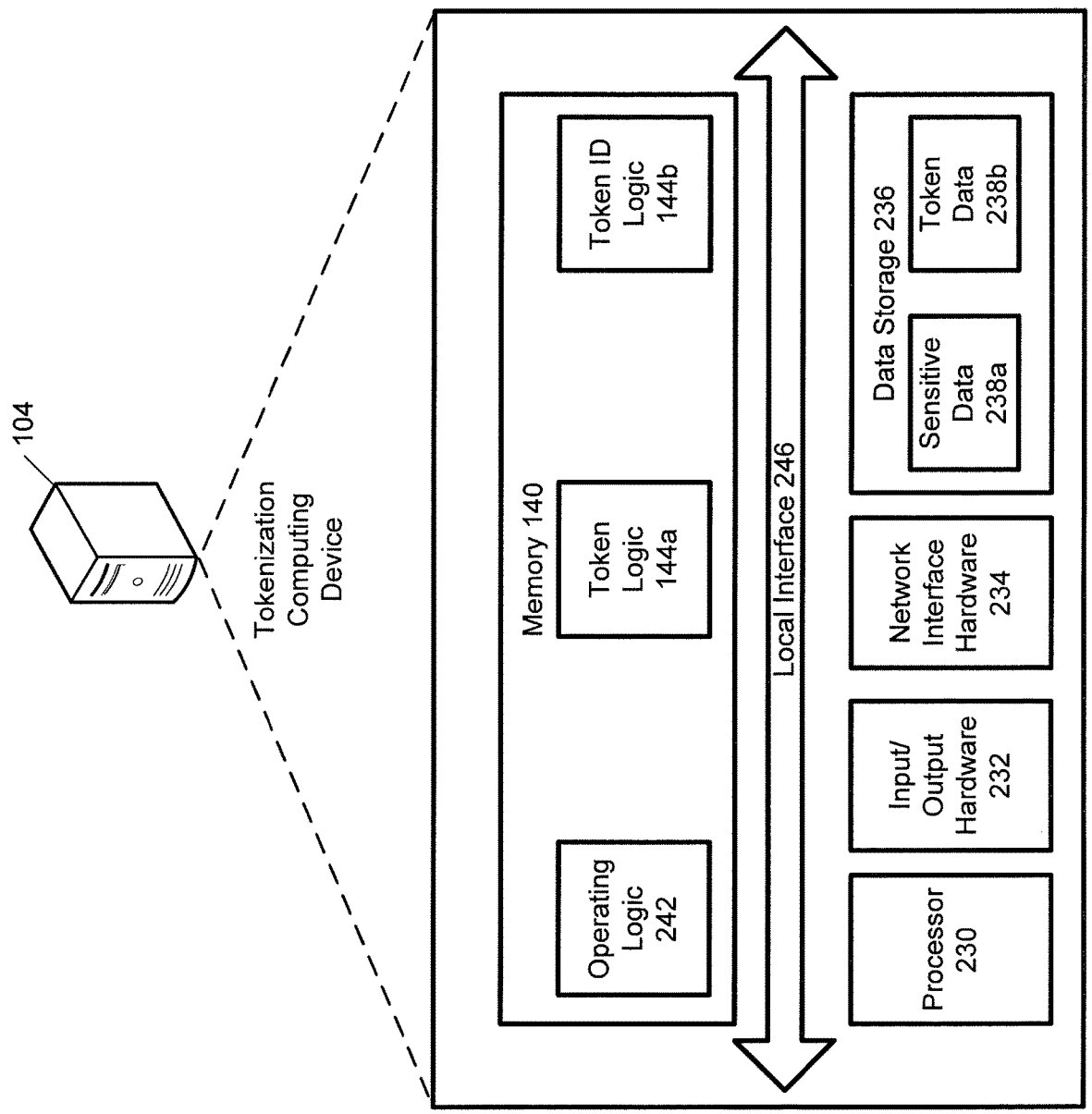
FIG. 2 depicts a computing architecture for tokenizing sensitive data, according to embodiments disclosed herein.

FIG. 2 depicts a computing architecture for tokenizing sensitive data, according to embodiments disclosed herein. In the illustrated embodiment, the tokenization computing device 104 includes at least one processor 230, input/output hardware 232, network interface hardware 234, a data storage component 236 (which includes token data 238a, token ID data 238b, and/or other data), and the memory component 140. The memory component 140 may be configured as volatile and/or nonvolatile memory and, as such, may include random access memory (including SRAM, DRAM, and/or other types of RAM), flash memory, secure digital (SD) memory, registers, compact discs (CD), digital video discs (DVD), and/or other types of non-transitory computer-readable mediums. Depending on the particular embodiment, these non-transitory computer-readable mediums may reside within the tokenization computing device 104 and/or external to the tokenization computing device 104.

Additionally, the memory component 140 may be configured to store operating logic 242, the token logic 144a, and/or the token ID logic 144b. The operating logic 242 may include an operating system, basic input output system (BIOS), and/or other hardware, software, and/or firmware for operating the tokenization computing device 104. The token logic 144a and the token ID logic 144b may each include a plurality of different pieces of logic, each of which may be embodied as a computer program, firmware, and/or hardware, as an example. A local interface 246 is also included in FIG. 2 and may be implemented as a bus or other interface to facilitate communication among the components of the tokenization computing device 104.

The processor 230 may include any processing component operable to receive and execute instructions (such as from the data storage component 236 and/or memory component 140). The input/output hardware 232 may include and/or be configured to interface with a monitor, positioning system, keyboard, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the tokenization computing device 104 and other computing devices. The processor 230 may also include and/or be coupled to a graphical processing unit (GPU).

It should be understood that the components illustrated in FIG. 2 are merely exemplary and are not intended to limit the scope of this disclosure. As an example, while the components in FIG. 2 are illustrated as residing within the tokenization computing device 104, this is merely an example. In some embodiments, one or more of the components may reside external to the tokenization computing device 104. It should also be understood that, while the tokenization computing device 104 in FIG. 2 is illustrated as a single device, this is also merely an example. In some embodiments, the token logic 144a and the token ID logic 144b may reside on different devices. Additionally, while the tokenization computing device 104 is illustrated with the token logic 144a and the token ID logic 144b as separate logical components, this is also an example. In some embodiments, a single piece of logic may perform the described functionality.

Figure 3:
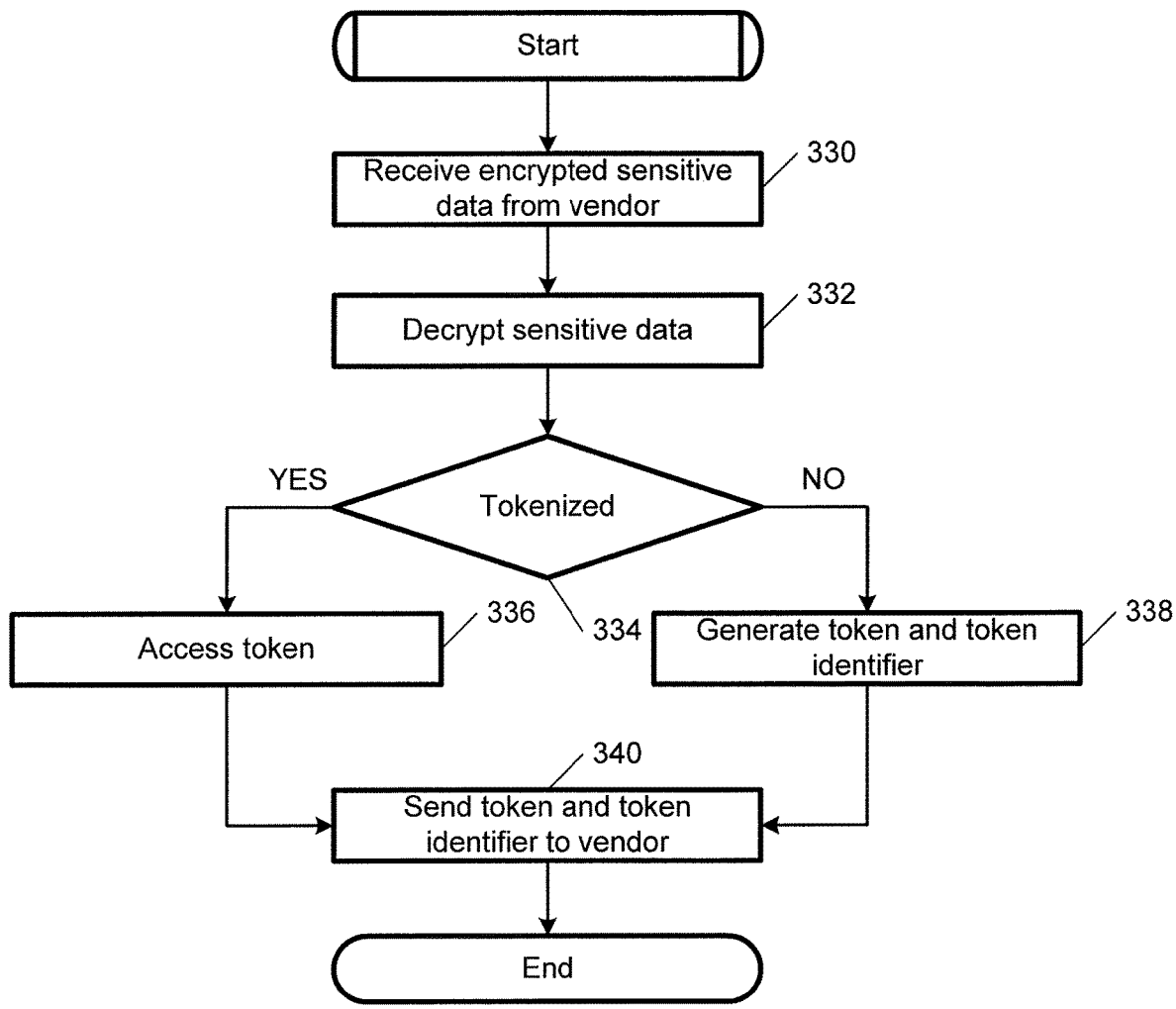
FIG. 3 depicts a flowchart for utilizing a database model to send a token and token identifier to a vendor, according to embodiments disclosed herein.

FIG. 3 depicts a flowchart for utilizing a database model to send a token and token identifier to a vendor, according to embodiments disclosed herein. As illustrated at block 330, encrypted sensitive data may be received from a vendor. More specifically, at the point of sale, a vendor (or user) may enter sensitive data for a transaction. The received sensitive data may be encrypted, such that transmission of the sensitive data to the tokenization computing device 104 is at least somewhat secure. This may be referred to as a point-to-point or end-to-end encryption. At block 332, the received sensitive data may be decrypted. At block 334, a determination may be made regarding whether the received sensitive data has previously been tokenized. A lookup may be performed on the sensitive data to see if a token has already been generated. If so, at block 336, the previously generated token and token identifier may be accessed. If at block 334, a token has not been generated, at block 338 a token and token ID may be generated. Generation of a token may include determining the vendor. Once the vendor is determined, a token key may be determined. The token may then be generated, based on an algorithm that depends on the token key. Additionally, the token identifier may identify the key (which may include a version number of the token), as well as a token sanity value for ensuring that the token is accurately generated. At block 340, the token and token ID may be sent to the vendor.

With the token and token ID, the vendor no longer needs to utilize the received sensitive data for the user. As such, subsequent interaction between the user and vendor may be facilitated with the token. This allows secure transactions between the user and vendor, as well as between the vendor and the financial institution.

Figure 4:
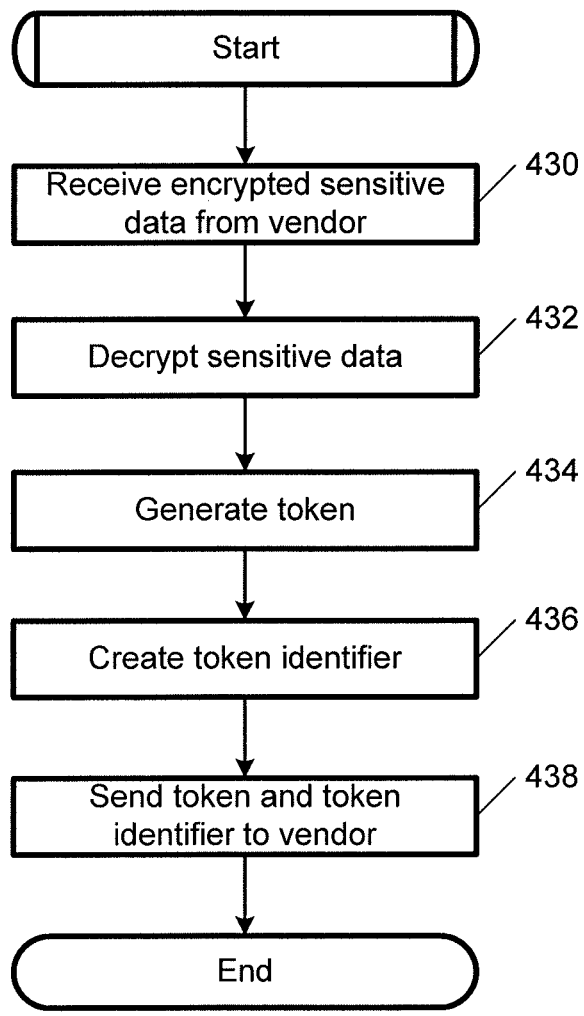
FIG. 4 depicts a flowchart for using an algorithmic model to send a token and token identifier to a vendor, according to embodiments disclosed herein.
Figure 5:
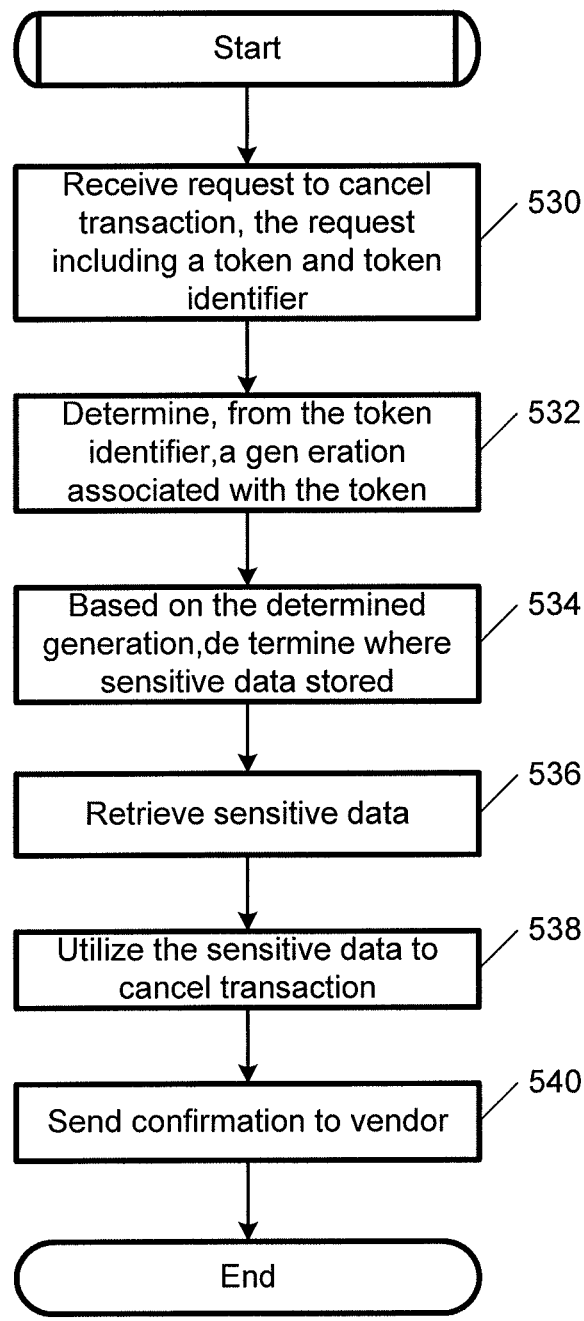
FIG. 5 depicts a flowchart for canceling a transaction utilizing a token and token identifier in a database model, according to embodiments disclosed herein.

FIG. 4 depicts a flowchart for using an algorithmic model to send a token and token identifier to a vendor, according to embodiments disclosed herein. More specifically, while the embodiment of FIG. 3 involves storage of tokens and/or token IDs at the tokenization computing device 104, the embodiment of FIG. 4 is directed to an algorithmic model that does not store these values. More specifically, at block 430, encrypted sensitive data may be received from a vendor. At block 432, the sensitive data may be decrypted. At block 434, a token can be generated. Similar to the block 338 from FIG. 3, the tokenization computing device 104 may determine the vendor that sent the sensitive information to determine a token key to utilize. With the tokenization key, the tokenization computing device 104 can generate the token. At block 436, a corresponding token identifier may be created. As discussed above, the token identifier may identify the token version number, the token key, and/or a sanity value. At block 438, the token and token identifier may be sent to the vendor FIG. 5 depicts a flowchart for canceling a transaction utilizing a token and token identifier in a database model, according to embodiments disclosed herein. As illustrated at block 530, a request to cancel a transaction may be received, where the request includes a token and token identifier. At block 532, a determination may be made from the token identifier regarding generation associated with the token. At block 534, based on the determined generation, a determination may be made regarding where the associated sensitive data is stored. At block 536, the sensitive data that corresponds to the received token may be retrieved. Additionally the token identifier may be utilized to check whether the retrieved sensitive data is the correct sensitive data. At block 538, the sensitive data may be utilized to cancel the transaction. At block 540, a confirmation of the cancelation may be sent to the vendor.

Figure 6:
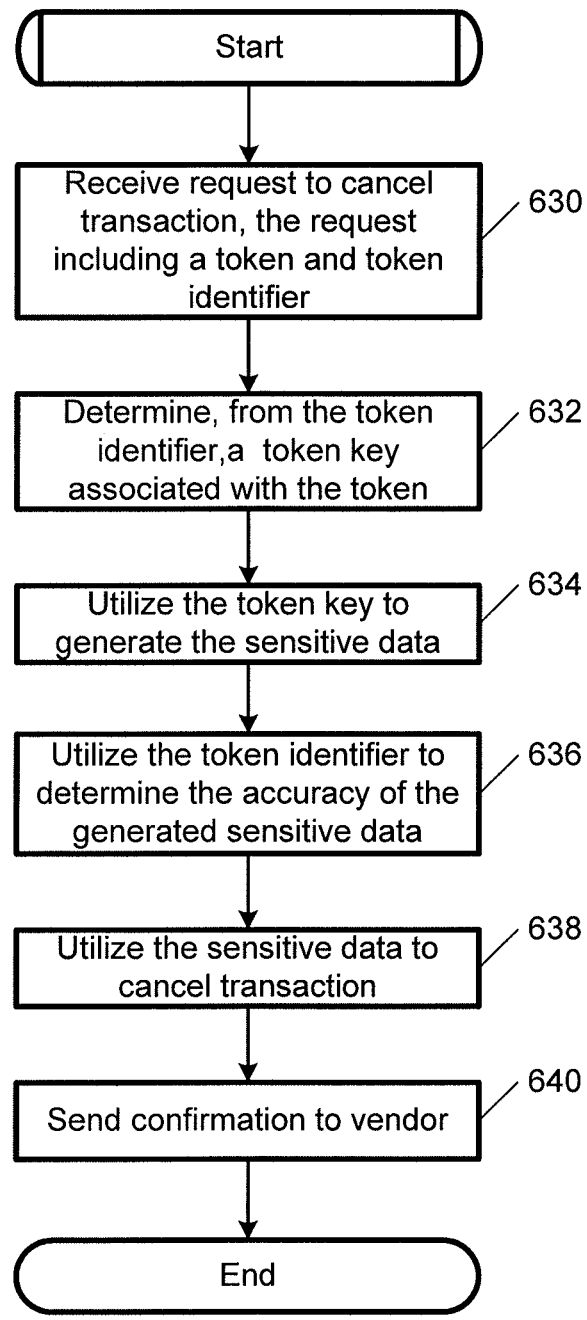
FIG. 6 depicts a flowchart for canceling a transaction utilizing a token and token identifier in an algorithmic model, according to embodiments disclosed herein.

FIG. 6 depicts a flowchart for canceling a transaction utilizing a token and token identifier in an algorithmic model, according to embodiments disclosed herein. Similar to FIG. 4 above, FIG. 6 relates to an algorithmic model, where the sensitive data may not be stored and/or accessed. At block 630, a request to cancel a transaction may be received, where the request includes a token and token identifier. At block 632, a token key may be determined from the token identifier. At block 634, the token key may be utilized to generate the corresponding sensitive data. At block 636, the token identifier may be utilized to determine the accuracy of the generated sensitive data. At block 638, the sensitive data may be utilized to cancel the transaction. At block 640 a confirmation of the cancelation may be sent to the vendor.

Figure 7:
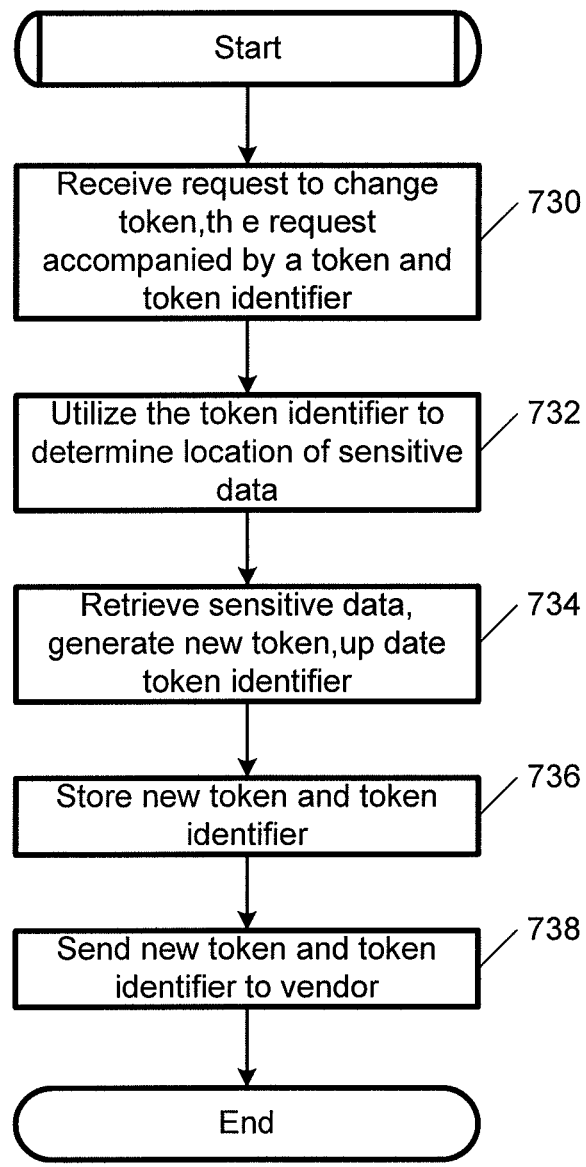
FIG. 7 depicts a flowchart for updating tokens in a database model, according to embodiments disclosed herein.

FIG. 7 depicts a flowchart for updating tokens in a database model, according to embodiments disclosed herein. As illustrated, at block 730, a request to change a token may be received, where the request includes a token and token identifier. While FIG. 7 indicates that a single token and a single token identifier being received, it should be understood that depending on the particular embodiment, a plurality of tokens and token identifiers may be received in a token batch. Regardless, at block 732, the token identifier may be utilized to determine a location of sensitive data. At block 734, the sensitive data may be retrieved, a new token may be generated, and the token identifier may be updated. The new token may be generated based on a new token key for a particular vendor. Once the token key is determined a proprietary algorithm may be utilized to generate the token. Additionally, the token key may be updated to identify the new version. The token key may additionally include a sanity value to ensure tokenization and/or detokenization is accurately performed. At block 736, the new token and token identifier may be stored. At block 738, the new token and token identifier may be sent to the vendor.

Figure 8:
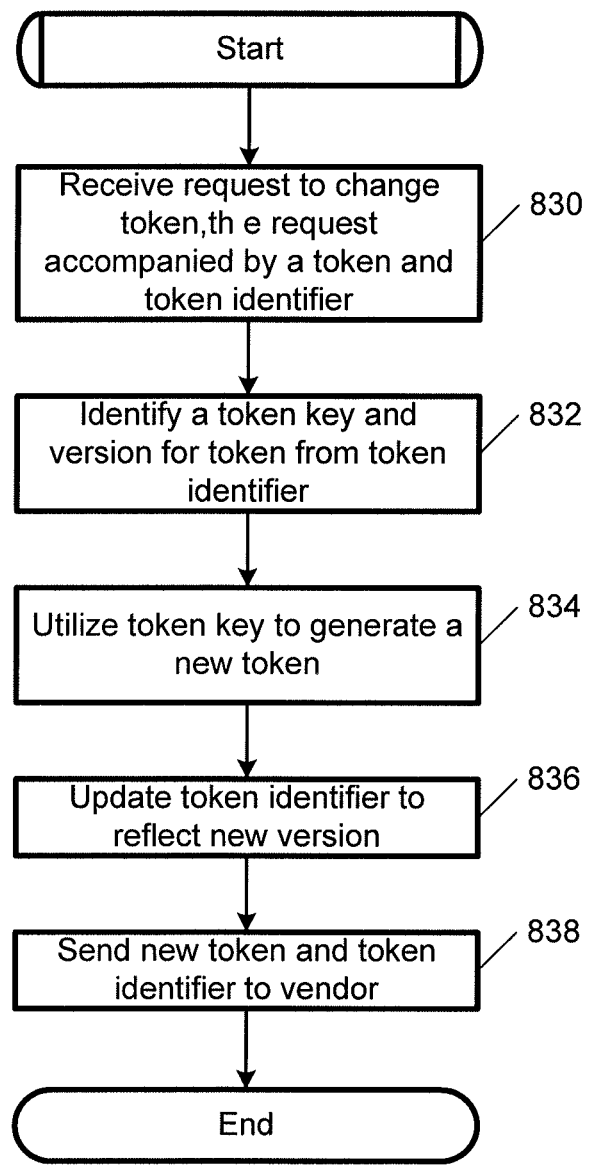
FIG. 8 depicts a flowchart for updating tokens in an algorithmic model, according to embodiments disclosed herein.

FIG. 8 depicts a flowchart for updating tokens in an algorithmic model, according to embodiments disclosed herein. As illustrated in block 830, a request to change a token may be received, where the request includes a token and a token identifier. While FIG. 8 indicates that a single token and a single token identifier are received, it should be understood that depending on the particular embodiment, a plurality of tokens and token identifiers may be received in a token batch. At block 832, a token key and version may be determined from the token identifier. At block 834, the token key may be utilized to generate an updated token. At block 836, the token identifier may be updated to reflect the new token key version. At block 838, the new token and the new token identifier may be sent to the vendor.

Figure 9:
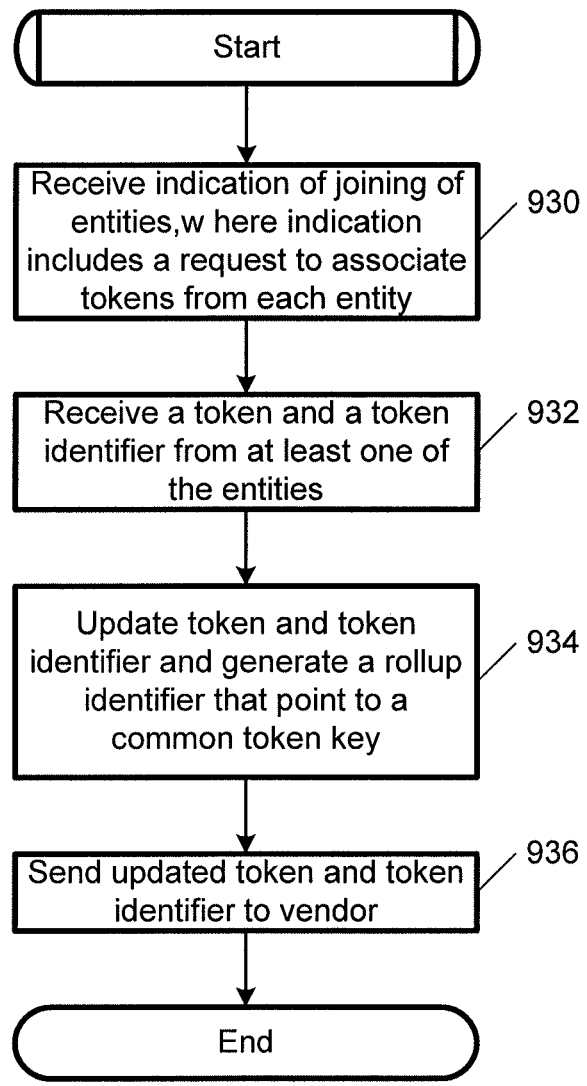
FIG. 9 depicts a flowchart for associating a common token key for a plurality of related entities, according to embodiments disclosed herein.

FIG. 9 depicts a flowchart for associating a common token key for a plurality of related entities, according to embodiments disclosed herein. As illustrated in block 930, an indication that entities have joined together may be received, where the indication includes a request to associate tokens from each entity. As mentioned above, a plurality of entities may join together and wish to use similar tokens across all the entities. As such, a rollup identifier may include a pointer that points the tokens to the common token key. At block 932, a token and token identifier may be received from at least one of the entities. At block 934, the token and token identifier may be updated and a rollup identifier may be generated, which points to a common token key. Additionally, the rollup identifier may be stored in a lookup table for later access. At block 936, the updated token and token identifier may be sent to the vendor.

Figure 10:
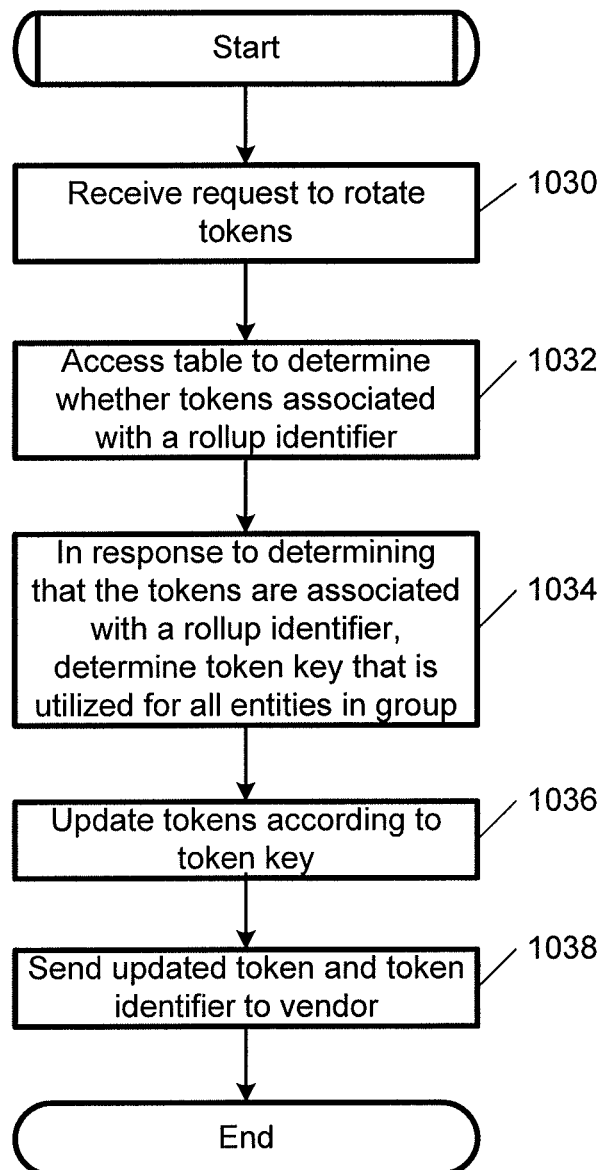
FIG. 10 depicts a flowchart for updating tokens for a plurality of related entities, according to embodiments disclosed herein.

FIG. 10 depicts a flowchart for updating tokens for a plurality of related entities, according to embodiments disclosed herein. As illustrated in block 1030, a request to rotate tokens may be received. At block 1032, a lookup table may be accessed to determine whether the tokens are associated with a rollup identifier. A determination may be first made into the token identifier to determine a token key, token version, etc.; however depending on the particular embodiments, the token identifier may not identify whether the present token is related to tokens from other entities. At block 1034, in response to determining that the tokens are associated with a rollup identifier, a token key may be determined that is utilized for all entities in the group of entities. At block 1036, the tokens may be updated according to the token identifier and/or rollup identifier. At block 1038, the updated tokens and/or token identifiers may be sent to the vendor.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

It should be understood that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all permutations and sub-permutations of all elements, features, and aspects discussed above. All such modifications and variations are intended to be included herein within the scope of this disclosure.

The invention claimed is:

1. A method for tokenization of sensitive data, comprising:
   receiving, by a tokenization computing device, sensitive data from a vendor computing device associated with a vendor;
   generating, by the tokenization computing device and using a token key of the vendor, a unique vendor-specific token associated with the sensitive data;
   receiving, by the tokenization computing device, a request to change the unique vendor-specific token, wherein the request includes the unique vendor-specific token and a token identifier linked to the unique vendor-specific token in a database associated with the tokenization computing device;
   retrieving, by the tokenization computing device and using the token identifier, the sensitive data from the database;
   generating, by the tokenization computing device and using a new token key, a new token for associating with the sensitive data;
   in response to generating the new token, updating, by the tokenization computing device, the token identifier for associating with the new token; and
   sending, by the tokenization computing device, the updated token identifier and the new token to the vendor computing device, wherein a tokenization of the new token is validated using the updated token identifier.

2. The method of claim 1, further comprising:
   receiving, by the tokenization computing device, a request to rotate the new token;
   accessing, by the tokenization computing device, a table to determine whether the new token is associated with a rollup identifier;
   in response to determining that the new token is associated with the rollup identifier, determining, by the tokenization computing device, a new token key that is utilized for entities in a predetermined group;
   updating, by the tokenization computing device, the new token according to the new token key; and
   sending, by the tokenization computing device, the updated new token and the token identifier to the vendor.

3. The method of claim 1, further comprising generating, by the tokenization computing device, a rollup identifier associated with the unique vendor-specific token, wherein the rollup identifier provides a pointer to the token key, wherein the token key is common to a plurality of entities.

4. The method of claim 1, further comprising:
   receiving, by the tokenization computing device, an indication of joining of the vendor with a second entity, wherein the indication includes a request to associate the new token with another token from the second entity;
   updating, by the tokenization computing device, the token identifier to generate a rollup identifier that points to a common token key for the vendor and the second entity; and
   sending, by the tokenization computing device, the updated token and the token identifier to the vendor.

5. The method of claim 1, wherein the token identifier includes a sanity value.

6. A system for tokenization of sensitive data, comprising:
   a tokenization computing device comprising a processor; and
   a memory component that is coupled to the processor and stores logic that when executed by the processor, causes the system to perform at least the following:
   receive, by the tokenization computing device, sensitive data from a vendor computing device associated with a vendor;
   generate, by the tokenization computing device and using a token key of the vendor, a unique vendor-specific token associated with the sensitive data;
   receive, by the tokenization computing device, a request to change the unique vendor-specific token, wherein the request includes the unique vendor-specific token and a token identifier linked to the unique vendor-specific token in a database associated with the tokenization computing device;
   retrieve, by the tokenization computing device and using the token identifier, the sensitive data from the database;
   generate, by the tokenization computing device and using a new token key, a new token for associating with the sensitive data;
   in response to generating the new token, update, by the tokenization computing device, the token identifier for associating with the new token; and
   send, by the tokenization computing device, the updated token identifier and the new token to the vendor computing device, wherein a tokenization of the new token is validated using the updated token identifier.

7. The system of claim 6, wherein the sensitive data includes at least one of a credit card number, a debit card number, a prepaid card number, a social security number, a bank account number, a telephone number, and an address.

8. The system of claim 6, wherein the logic further causes the system to store the new token and the token identifier.

9. The system of claim 6, wherein the logic further causes the system to generate a rollup identifier associated with the unique vendor-specific token, wherein the rollup identifier provides a pointer to the token key, wherein the token key is common to a plurality of entities.

10. The system of claim 6, wherein the logic further causes the system to perform at least the following:
receive sensitive data from the vendor computing device;
determine the token key for the vendor;
link the vendor-specific token and the token identifier in a database;
generate the vendor-specific token; and
create the token identifier that comprises data related to the token key.

11. The system of claim 6, wherein the logic further causes the system to perform at least the following:
receive a request to rotate the new token;
access a table to determine whether the new token is associated with a rollup identifier;
in response to determining that the new token is associated with a rollup identifier, determine a new token key that is utilized for entities in a predetermined group;
update the new token according to the new token key; and
send the updated new token and the token identifier to the vendor computing device.

12. The system of claim 6, wherein the token identifier includes a sanity value.

13. A non-transitory computer-readable medium for tokenization of sensitive data that stores a program that when executed by a tokenization computing device, causes the tokenization computing device to perform operations including:
receive, by the tokenization computing device, sensitive data from a vendor computing device associated with a vendor;
generate, by the tokenization computing device and using a token key of the vendor, a unique vendor-specific token associated with the sensitive data;
receive, by the tokenization computing device, a request to change the unique vendor-specific token, wherein the request includes the unique vendor-specific token and a token identifier linked to the unique vendor-specific token in a database associated with the tokenization computing device;
retrieve, by the tokenization computing device and using the token identifier, the sensitive data from the database;
generate, by the tokenization computing device and using a new token key, a new token for associating with the sensitive data;
in response to generating the new token, update, by the tokenization computing device, the token identifier for associating with the new token; and
send, by the tokenization computing device, the updated token identifier and the new token to the vendor computing device, wherein a tokenization of the new token is validated using the updated token identifier.

14. The non-transitory computer-readable medium of claim 13, wherein the sensitive data includes at least one of a credit card number, a debit card number, a prepaid card number, a bank account number, a social security number, a telephone number, and an address.

15. The non-transitory computer-readable medium of claim 13, wherein the program further causes the computing device to perform at least the following:
receive a request to rotate the token;
access a table to determine whether the token is associated with a rollup identifier;
in response to determining that the token is associated with a rollup identifier, determine a new token key that is utilized for entities in a predetermined group; and
update the token according to the new token key.

16. The non-transitory computer-readable medium of claim 13, wherein the program further causes the tokenization computing device to store the new token and the token identifier.

17. The non-transitory computer-readable medium of claim 13, wherein the program further causes the tokenization computing device to generate a rollup identifier associated with the unique vendor-specific token, wherein the rollup identifier provides a pointer to the token key, wherein the token key is common to a plurality of entities.

18. The non-transitory computer-readable medium of claim 13, wherein the program further causes the computing device to perform at least the following:
receive an indication of joining of the vendor with a second entity, wherein the indication includes a request to associate the token with another token from the second entity;
update the token identifier to generate a rollup identifier that points to a common token key to the vendor and the second entity; and
send the updated token and the token identifier to the vendor computing device.

19. The non-transitory computer-readable medium of claim 13, wherein the token identifier includes a sanity value.

* * * * *